(12) United States Patent
Yae

(10) Patent No.: US 12,283,273 B2
(45) Date of Patent: Apr. 22, 2025

(54) SERVICE MANAGEMENT SYSTEM AND SERVICE MANAGEMENT METHOD FOR A VEHICLE

(71) Applicants: HYUNDAI MOTOR COMPANY, Seoul (KR); KIA CORPORATION, Seoul (KR)

(72) Inventor: Seong Soo Yae, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 343 days.

(21) Appl. No.: 18/071,782

(22) Filed: Nov. 30, 2022

(65) Prior Publication Data
US 2023/0206916 A1     Jun. 29, 2023

(30) Foreign Application Priority Data
Dec. 29, 2021    (KR) .......................... 10-2021-0191572

(51) Int. Cl.
| | |
|---|---|
| *G10L 15/22* | (2006.01) |
| *B60R 16/037* | (2006.01) |
| *G06F 40/279* | (2020.01) |
| *G06F 40/30* | (2020.01) |
| *G06Q 50/40* | (2024.01) |
| *G10L 15/18* | (2013.01) |
| *G10L 15/30* | (2013.01) |

(52) U.S. Cl.
CPC .......... *G10L 15/22* (2013.01); *B60R 16/0373* (2013.01); *G06F 40/279* (2020.01); *G06F 40/30* (2020.01); *G06Q 50/40* (2024.01); *G10L 15/1815* (2013.01); *G10L 15/30* (2013.01); *G10L 2015/223* (2013.01)

(58) Field of Classification Search
CPC ............... G10L 15/22; G10L 2015/223; B60R 16/0373; G06F 40/279; H04B 1/082
USPC ............................ 381/86; 704/231, 246, 251
See application file for complete search history.

(56) References Cited

U.S. PATENT DOCUMENTS

2002/0071573 A1 *   6/2002   Finn ........................ H04M 9/08
                                                  381/95

* cited by examiner

*Primary Examiner* — George C Monikang
(74) *Attorney, Agent, or Firm* — Lempia Summerfield Katz LLC

(57) ABSTRACT

Provided are a service management system for a vehicle and a service management method for a vehicle that may receive a request from a passenger in a van by voice. In particular, the service management system determines whether to approve the request considering other passengers' opinions in the van, and then automatically performs relevant controls to fully reflect the passenger's request and safely provide a service even in the van carrying a large number of passengers.

20 Claims, 15 Drawing Sheets

FIG. 15

| Zone1, Seat2 | Zone1, Seat2 | Zone1, Seat2 | Zone1, Seat2 | Zone1, Seat2 |
|---|---|---|---|---|
| ☀🌡 ⊘⊗ | 🌡❄ ⊘⊗ | 📻 FM 89.1Mhz ⊘⊗ | 🎙 PodCast ⊘⊗ | 🚏 PASSENGER GETS OFF AT NEXT STOP ⊘⊗ |
| Domain: AIR CONDITIONING<br>Task: DECREASE TEMPERATURE (IT IS COLD) | Domain: AIR CONDITIONING<br>Task: INCREASE TEMPERATURE (IT IS HOT) | Domain: MULTIMEDIA<br>Task: TURN ON 89.1 MHZ RADIO (TURN ON COOL FM) | Domain: MULTIMEDIA<br>Task: PODCAST PLAYBACK (PLAY PODCAST) | Domain: DROP-OFF NOTIFICATION<br>Task: STOP AT NEXT STOP |

SERVICE MANAGEMENT SYSTEM AND SERVICE MANAGEMENT METHOD FOR A VEHICLE

CROSS-REFERENCE TO RELATED APPLICATION

This application is based on and claims priority under 35 U.S.C. § 119 to Korean Patent Application No. 10-2021-0191572, filed on Dec. 29, 2021 in the Korean Intellectual Property Office, the disclosure of which is incorporated herein by reference.

BACKGROUND

1. Technical Field

The disclosure relates to a service management system for a vehicle and relates to a service management method for a vehicle that may manage a service provided to passengers in a vehicle.

2. Description of the Related Art

Unlike a passenger car, in a van carrying a lot of passengers, a passenger may not directly adjust an air conditioner or a multimedia device, etc. Also, passengers have different wishes, and thus a driver of a van could hardly provide a service desired by each passenger.

Accordingly, when a passenger in a van is uncomfortable with an indoor temperature or output of multimedia content, the passenger is required to make a request loudly to make the passenger's voice heard or required to directly move to a driver's seat.

However, speaking loudly in a van may cause inconvenience to other passengers and passenger's movement during driving may lead to an accident.

Also, talking to the driver whenever each passenger makes a request distracts the driver, which may threaten safety.

SUMMARY

An aspect of the disclosure provides a service management system for a vehicle and provides a service management method for a vehicle that may receive a request from a passenger in a van by voice, determine whether to approve the request considering other passengers' opinions in the van, and then automatically perform relevant controls, thereby fully reflecting the passenger's request and safely providing a service even in the van carrying a large number of passengers.

Additional aspects of the disclosure should be set forth, in part, in the following description and should be, in part, apparent from the description or may be learned by practice of the disclosure.

According to an embodiment of the disclosure, there is provided a service management system for a vehicle that manages a service provided to the vehicle. In one embodiment, the service management system includes: a speech recognition module configured to convert a request of a passenger input by voice into text; a natural language understanding module configured to determine a domain and a task corresponding to the request of the passenger, based on the text; and a controller. The controller is configured to: determine whether the request of the passenger belongs to a global service or a local service based on the determined domain and task. When the request of the passenger belongs to the global service, the controller is further configured to determine whether to approve the request of the passenger based on other passengers' requests in the vehicle. When the request of the passenger belongs to the local service, the controller is also configured to determine whether to approve the request of the passenger based on requests of other passengers located in a same zone as the passenger in the vehicle.

In another embodiment, when the request of the passenger belongs to the global service, the controller is configured to determine whether a request identical to the request of the passenger is input from a reference rate or more of passengers of all passengers in the vehicle.

In another embodiment, when the request of the passenger belongs to the global service, the controller is configured to approve the request of the passenger, based on the request identical to the request of the passenger being input from the reference rate or more of the passengers.

When the request of the passenger belongs to the global service, the controller is configured to generate an inquiry signal for inquiring of all the passengers in the vehicle whether to approve the request of the passenger, based on the request identical to the request of the passenger being input from a first reference rate or more of passengers. The controller is also configured to approve the request of the passenger, based on rejections not being input from a second reference rate or more of passengers of all the passengers.

When the request of the passenger belongs to the local service, the controller is configured to approve the request of the passenger, based on a request identical to the request of the passenger being input from a reference rate or more of passengers of all passengers in the same zone as the passenger.

The controller is configured to determine whether the request of the passenger belongs to a personal service. When the request of the passenger belongs to the personal service, the controller is also configured to determine a location of a seat of the passenger and generate a control signal for providing a service corresponding to the request based on the location of the seat of the passenger.

The service management system further includes a communication module configured to communicate with a user terminal of the passenger or the vehicle.

The controller is configured to generate an audible inquiry signal for audibly inquiring of all the passengers in the vehicle whether to approve the request of the passenger. The controller is also configured to control the communication module to transmit the generated audible inquiry signal to the user terminal of the passenger or the vehicle.

The controller is configured to generate a visual inquiry signal for visually inquiring of all the passengers in the vehicle whether to approve the request of the passenger. The controller is configured to control the communication module to transmit the generated visual inquiry signal to the user terminal of the passenger or the vehicle.

The controller is configured to control the communication module to transmit the inquiry signal to the user terminal of the passenger.

According to an embodiment of the disclosure, a service management method for a vehicle that manages a service provided to the vehicle includes converting a request of a passenger input by voice into text. The method also includes determining a domain and a task corresponding to the request of the passenger based on the text. The method also includes determining whether the request of the passenger belongs to a global service or a local service based on the determined domain and task. The method also includes when the request of the passenger belongs to the global service, determining whether to approve the request of the passenger based on other passengers' requests in the vehicle. The method also includes when the request of the passenger belongs to the local service, determining whether to approve the request of the passenger based on requests of other passengers located in a same zone as the passenger in the vehicle.

When the request of the passenger belongs to the global service, the determining of whether to approve the request of the passenger determines whether a request identical to the request of the passenger is input from a reference rate or more of passengers of all passengers in the vehicle.

When the request of the passenger belongs to the global service, the determining of whether to approve the request of the passenger approves the request of the passenger, based on the request identical to the request of the passenger being input from the reference rate or more of the passengers.

When the request of the passenger belongs to the global service, the determining of whether to approve the request of the passenger generates an inquiry signal for inquiring of all the passengers in the vehicle whether to approve the request of the passenger, based on the request identical to the request of the passenger being input from a first reference rate or more of passengers, and approves the request of the passenger, based on rejections not being input from a second reference rate or more of passengers of all the passengers.

When the request of the passenger belongs to the local service, the determining of whether to approve the request of the passenger approves the request of the passenger, based on a request identical to the request of the passenger being input from a reference rate or more of passengers of all passengers in the same zone as the passenger.

The service management method further includes determining whether the request of the passenger belongs to a personal service; when the request of the passenger belongs to the personal service, determining a location of a seat of the passenger; and generating a control signal for providing a service corresponding to the request based on the location of the seat of the passenger.

The determining of whether to approve the request of the passenger includes generating an audible inquiry signal for audibly inquiring of all passengers in the vehicle whether to approve the request of the passenger and includes transmitting the generated audible inquiry signal to a user terminal of the passenger or the vehicle.

The determining of whether to approve the request of the passenger includes generating a visual inquiry signal for visually inquiring of all passengers in the vehicle whether to approve the request of the passenger and includes transmitting the generated visual inquiry signal to a user terminal of the passenger or the vehicle.

The service management method further includes transmitting, to the vehicle, information about the domain and the task corresponding to the request of the passenger.

The determining of whether to approve the request of the passenger includes generating an audible inquiry signal for audibly inquiring of all passengers in the vehicle whether to approve the request of the passenger during daytime and comprises generating a visual inquiry signal for visually inquiring of all the passengers in the vehicle whether to approve the request of the passenger at night.

BRIEF DESCRIPTION OF THE DRAWINGS

These and/or other aspects of the disclosure should become apparent and more readily appreciated from the following description of the embodiments, taken in conjunction with the accompanying drawings of which:

FIG. 15 is a diagram illustrating an example of information provided to a driver through a display in a vehicle according to an embodiment.

DETAILED DESCRIPTION

Figure 1:
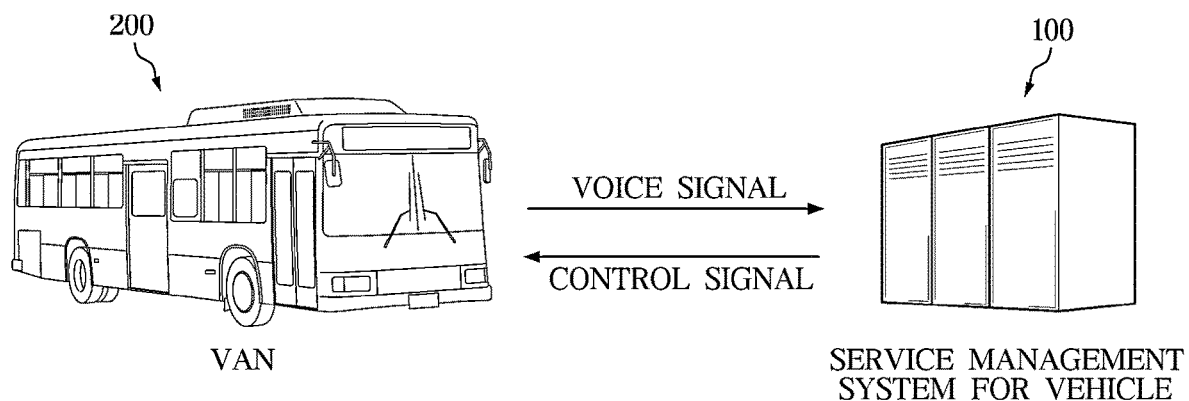
FIG. 1 is a diagram illustrating information exchanged between a vehicle and a service management system according to an embodiment.

The embodiments set forth herein and illustrated in the configuration of the disclosure are only embodiments, so it should be understood that they may be replaced with various equivalents and modifications at the time of the disclosure.

Like reference numerals throughout the specification denote like elements.

Terminologies used herein are for the purpose of describing particular embodiments only and are not intended to limit the disclosure. It should be understood that the singular forms are intended to include the plural forms as well, unless the context clearly dictates otherwise. It should be further understood that the terms "include", "comprise", and/or "have" used in this specification, specify the presence of stated features, integers, steps, operations, elements, and/or components but do not preclude the presence or addition of one or more other features, integers, steps, operations, elements, components, and/or groups thereof.

It should be understood that, although the terms first, second, etc. may be used herein to describe various elements, the various elements should not be limited by these terms. For example, without departing from the technical spirit or essential features of the disclosure, a first element may be referred to as a second element, and also a second element may be referred to as a first element. As used herein, the term "and/or" includes any and all combinations of one or more of the associated listed items.

Further, the terms such as "~part", "~device", "~block", "~member", "~module", and the like may refer to a unit for processing at least one function or act. For example, the terms may refer to at least process processed by at least one hardware, such as field-programmable gate array (FPGA)/ application specific integrated circuit (ASIC), software stored in memories or processors. When a part, device, block, member, module, or the like of the present disclosure is described as having a purpose or performing an operation, function, or the like, the part, device, block, member, module, or the like should be considered herein as being "configured to" meet that purpose or to perform that operation or function.

Reference numerals used for method steps are just used for convenience of explanation but not to limit an order of the steps. Thus, unless the context clearly dictates otherwise, the written order may be practiced otherwise.

Hereinafter, embodiments of the disclosure are described in detail with reference to the accompanying drawings.

Figure 2:
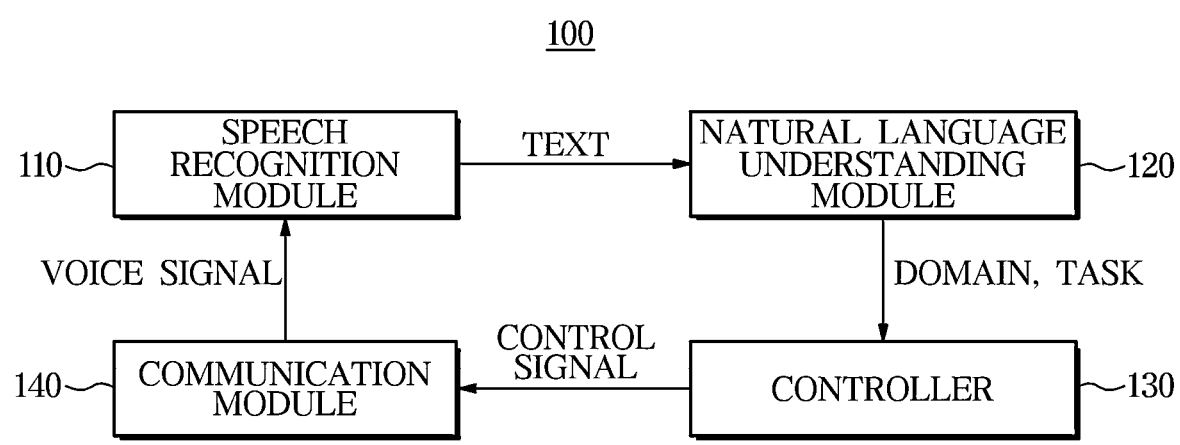
FIG. 2 is a block diagram illustrating a service management system according to an embodiment.
Figure 3:
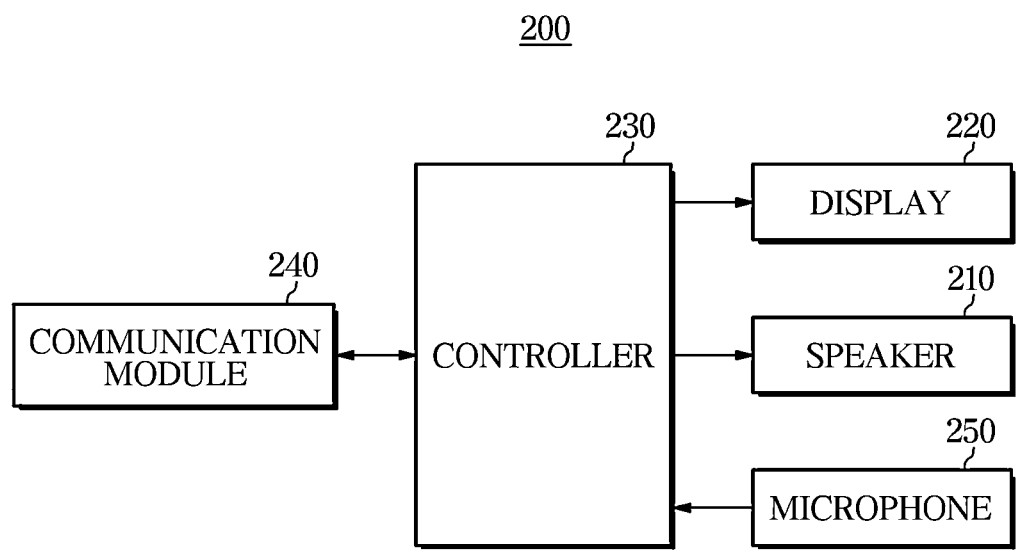
FIG. 3 is a block diagram illustrating a vehicle according to an embodiment.

FIG. 1 is a diagram illustrating information exchanged between a vehicle and a service management system according to an embodiment. FIG. 2 is a block diagram illustrating a service management system according to an embodiment. FIG. 3 is a block diagram illustrating a vehicle according to an embodiment.

Referring to FIG. 1, a service management system for a vehicle 100 (hereinafter, "service management system") according to an embodiment may be a system capable of managing a service provided to a passenger in a vehicle 200 and may be implemented with a server. The service management system 100 may communicate with a plurality of vehicles 200 and independently manage services provided to each of the plurality of vehicles 200.

Also, the service management system 100 may receive a request of a passenger in the vehicle 200 by voice and thus may determine a service corresponding to the request of the passenger by applying a natural language processing technique, such as speech recognition, natural language understanding, etc., to a voice signal received from the vehicle 200.

The service management system 100 may generate a control signal for providing the service corresponding to the request of the passenger and transmit the generated control signal to the vehicle 200.

For example, the vehicle 200 may refer to a van carrying a large number of passengers. Standards for distinguishing vans and passenger cars may differ from country to country and may be changed by amendments to relevant laws and regulations. For instance, currently in South Korea, vehicles with up to 10 seats are classified as a passenger car, and those with 11 seats or more are classified as a van.

In the embodiment, however, the vehicle 200 is not necessarily defined by the number of passengers, and any vehicle may be the vehicle 200 as long as it may provide a service by operations to be described later.

Referring to FIG. 2, the service management system 100 according to an embodiment may include a speech recognition module 110, a natural language understanding module 120, a controller 130, and a communication module 140.

The speech recognition module 110 may convert a passenger's request input by voice into text.

The speech recognition module 110 may be implemented with a speech to text (STT) engine and perform conversion into text by applying a speech recognition algorithm to a voice signal.

For example, the speech recognition module 110 may extract feature vectors from a voice signal by applying a feature vector extraction method, such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To this end, an acoustic model for modeling and comparing signal characteristics of voice or a language model for modeling a linguistic order of recognition vocabulary, such as words or syllables, may be used.

In addition, the speech recognition module 110 may convert the voice signal into the text based on learning where deep learning or machine learning is applied. According to the embodiment, a way of converting the voice signal into the text by the speech recognition module 110 is not limited thereto, and a variety of speech recognition technologies may be applied to convert the voice signal into the text.

A recognition result of the speech recognition module 110, i.e., the text converted from the voice signal, may be input to the natural language understanding module 120. The natural language understanding module 120 may apply a natural language understanding (NLU) technique to determine user intention included in the text. Accordingly, the natural language understanding module 120 may include an NLU engine that determines the user intention by applying the NLU technique to an input text.

For instance, the natural language understanding module 120 may recognize an entity name from the input text. The entity name is a proper noun, such as a name of an individual person, place, organization, time, day, currency, and the like. Named-entity recognition is for identifying an entity name in a sentence and classifying a type of the identified entity. A keyword may be extracted from the sentence through named-entity recognition to understand the meaning of the sentence.

Also, the natural language understanding module 120 may determine a domain from the input text. The domain may be for identifying a subject of a user's speech. For example, domains representing various subjects, such as an air conditioning control, multimedia control, drop-off notification, door control, window control, etc., may be determined based on the input text.

In addition, the natural language understanding module 120 may analyze a speech act of the input text. Speech act analysis is for analyzing an intention of speech, such as whether a user asks a question, makes a request, responds, or simply expresses the user's emotions.

The natural language understanding module 120 may determine an intent and an entity required to perform the intent based on the domain, entity name, speech act extracted from the text.

For example, when the input text is "turn on the air conditioner", the domain may be [air conditioning control], and the intent may be [turn on, air conditioner]. Here, the entity required to perform control corresponding to such intent may be [temperature, air volume].

As another example, when the input text is "play a song", the domain may be [multimedia control], the intent may be [play, song], and the entity required to perform control corresponding to such intent may be [singer, name of song].

An operation finally performed in response to the user's speech may be defined by an intent and an entity, and in the embodiment, the operation defined by the intent and the entity is referred to as a task.

However, classification criteria and names, etc., of a domain and an intent may vary depending on a system. Accordingly, terms different from the terms used in the embodiment or different classification criteria may also be encompassed by a scope of the disclosure.

The controller 130 may generate a control signal for performing a task corresponding to a user intention and transmit the control signal to a subject performing the corresponding task through the communication module 140. An object to which the control signal is transmitted may include the vehicle 200 or a user terminal. The user terminal may include mobile devices, such as a smartphone, a tablet personal computer (PC), a laptop computer, a wearable device, and the like.

The communication module 140 may use various wireless communication methods to transmit and receive information with the user terminal or an external server. For example, the communication module 140 may employ at least one of wireless communication methods such as 3G (WCDMA/HSDPA/wibro), 4G (LTE/LTE-A), 5G, Wi-Fi, or the like.

The above-described service management system 100 may include at least one memory storing a program performing the aforementioned operations or operations to be described later and at least one processor implementing a stored program. The constituent components of the service management system 100 are divided based on an operation or function, and all or a portion of the constituent components may share the memory or processor.

The service management system 100 may be implemented with a server including at least one memory and at least one processor. Alternatively, a portion of functions of the service management system 100 may be performed by the vehicle 200 or a user terminal of a passenger, and the service management system 100 itself may be equipped with the vehicle 200.

Referring to FIG. 3, the vehicle 200 includes a microphone 250 to which a user's speech is input, a communication module 240, a controller 230, a display 220, and a speaker 210. Here, the communication module 240 transmits and receives a signal with the service management system 100 or a user terminal of a passenger, and the controller 230 performs overall control of the vehicle 200. The display 220 and the speaker 210 output multimedia content or information received from the service management system 100.

The communication module 240 may use various wireless communication methods to transmit and receive information with a user terminal of a passenger or the service management system 100. For example, the communication module 240 may employ at least one of various wireless communication methods such as 3G (WCDMA/HSDPA/wibro), 4G (LTE/LTE-A), 5G, Wi-Fi, Bluetooth, UWB, ZigBee, NFC, or the like.

The display 220 and the speaker 210 may output information received from the service management system 100 or output multimedia content.

Figure 4:
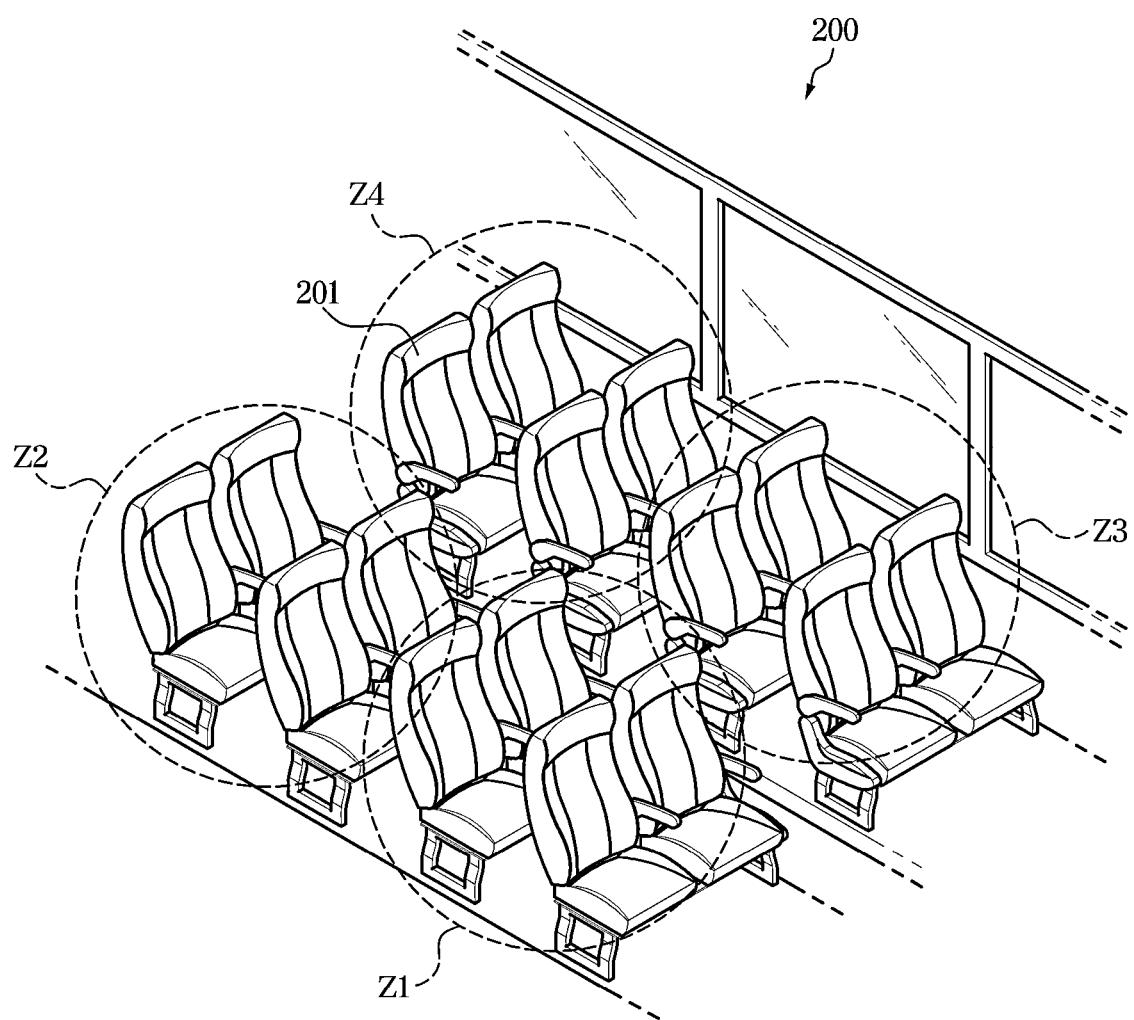
FIG. 4 is a schematic perspective view illustrating a seat configuration of a vehicle according to an embodiment.

FIG. 4 is a schematic perspective view illustrating a seat configuration of a vehicle according to an embodiment.

As shown in FIG. 4, the vehicle 200 may be a van capable of carrying a large number of passengers. A request of each passenger with respect to services provided in such a van may be hardly reflected.

For example, for air conditioning control, a temperature for each seat 201 may not be independently controlled. However, because apparent temperature or preferred temperature may vary for each individual, some passengers may feel hot and others may feel cold even at the same temperature.

As another example, for multimedia control, such as a radio playback, music playback or video playback, different content may not be played for each seat 201. However, because every individual has different preferences, some passengers may not want to hear or watch multimedia content, and desired multimedia content may be different.

In the embodiment, a service may be divided into a global service and a local service according to a service provision unit. Alternatively, a service may also be divided into a global service, a local service, and a personal service.

The global service may refer to a service equally provided to all passengers in the vehicle 200. For example, multimedia control such as music playback, radio playback, video playback, etc., may be included in the global service.

The local service may refer to a service equally provided to passengers of the seats 201 belonging to a same zone, when the plurality of seats 201 in the vehicle 200 is divided according to a predetermined criterion.

Referring to an example of FIG. 4, total seats may be divided into four zones Z1, Z2, Z3 and Z4, each of which includes four seats 201. In the embodiment, air conditioning control may be performed independently for each zone. Alternatively, lighting control may be performed independently for each zone.

In other words, air conditioning control or lighting control may be included in the local service. Meanwhile, the air conditioning control or lighting control may also be included in the global service according to a structure of the vehicle 200.

The personal service may refer to a service independently provided to each passenger in the vehicle 200. For example, a drop-off notification service may be included in the personal service. To provide the drop-off notification service, a passenger's destination is determined, a driver is notified of when the vehicle 200 approaches the passenger's destination, and the vehicle 200 is automatically stopped. Thus, the passenger may be assisted in getting off.

Also, the personal service may be provided through a user terminal of a passenger, or when an independent user interface (a display or a speaker) is provided in each seat 201, the personal service may be provided through the user interface.

The above-described services are only an example applicable to the embodiment. Considering a structure of the vehicle 200 or convenience for providing services, air conditioning control may be included in the global service or personal service, and multimedia control may be included in the local service or personal service.

Figure 5:
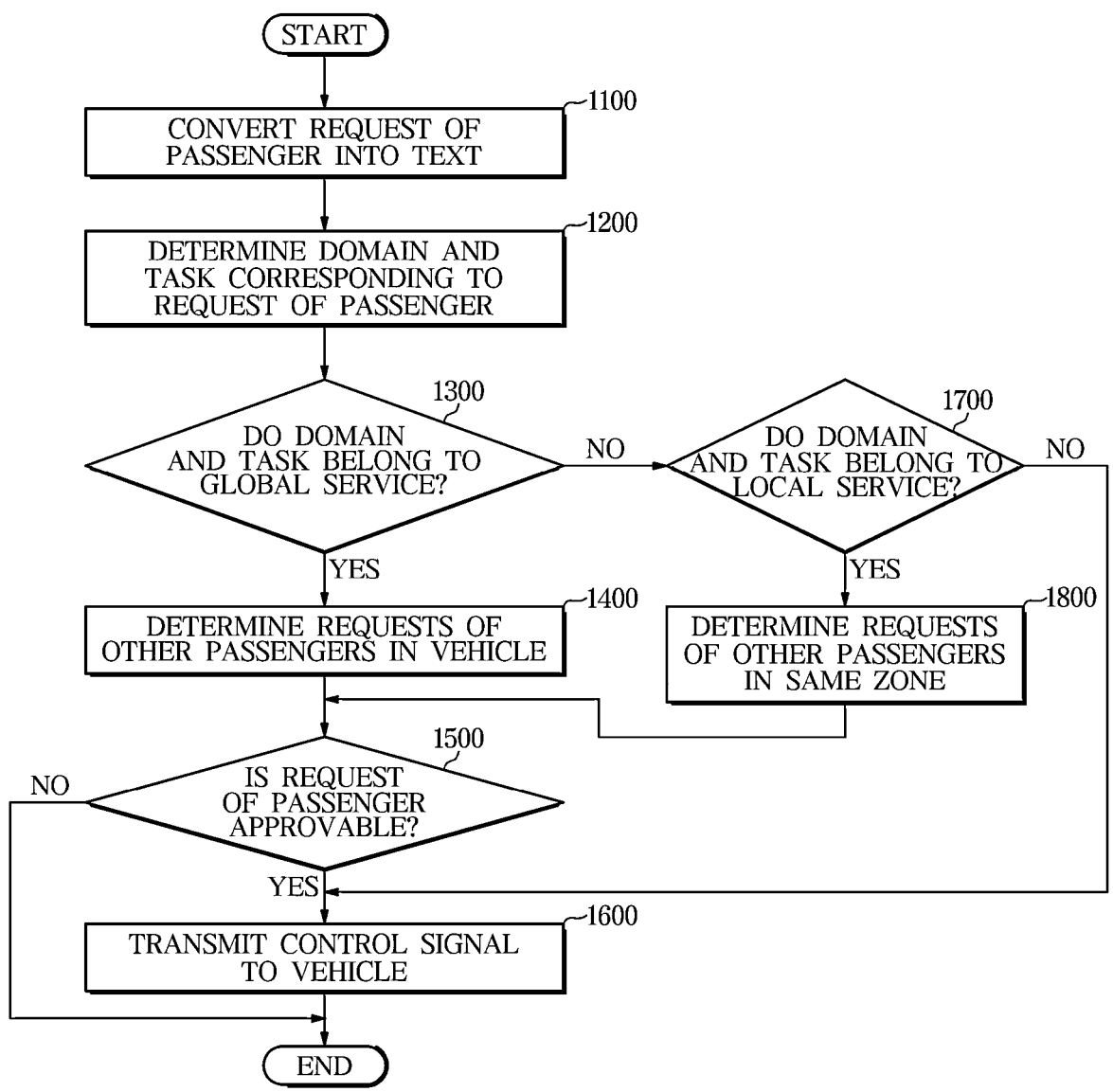
FIG. 5 is a flowchart illustrating a service management method for a vehicle according to an embodiment.

FIG. 5 is a flowchart illustrating a service management method for a vehicle according to an embodiment.

A service management method for a vehicle (hereinafter, "service management method") according to an embodiment may be performed by the service management system 100. Accordingly, without additionally being stated, a subject performing the service management method to be described later may be the service management system 100, and operations performed by the service management system 100 may be included in the service management method.

According to the service management method illustrated in FIG. 5, a request of a passenger is converted into text (1100).

As described above, the request of the passenger may be input through the microphone 250 provided in the vehicle 200. For example, the microphone 250 may be provided for each seat 201, and a single microphone 250 may be shared by a plurality of seats 201.

Alternatively, the request of the passenger may be input through a microphone provided in a user terminal of the passenger. A dedicated application for connecting to the service management system 100 may be installed in the user terminal. Also, the communication module 240 of the vehicle 200 may detect the user terminal inside the vehicle 200 and transmit a web page link to connect to the service management system 100.

Specifically, the vehicle 200 may transmit a broadcasting message to the user terminal in the vehicle 200 through a short-range communication module, such as Bluetooth, wi-fi, UWB, ZigBee, or NFC. The web page link to connect to the service management system 100 may be included in the transmitted message.

The request of the passenger input through the microphone of the vehicle 200 or the user terminal may be transmitted to the speech recognition module 110 of the service management system 100, and the speech recognition module 110 may convert the request of the passenger into text.

A domain and a task corresponding to the request of the passenger are determined (1200).

As described above, the natural language understanding module 120 may extract the domain, intent, entity, etc., from the input text, and the task may be determined by the intent and the entity.

When the determined domain and task belong to a global service (Yes in operation 1300), the controller 130 determines requests of other passengers in the vehicle 200 (1400). As a result of determining the other passengers' requests, when the request of the passenger is approvable (Yes in operation 1500), the controller 130 transmits a control signal for providing a global service corresponding to the request of the passenger to the vehicle 200 (1600).

When the determined domain and task do not belong to the global service (No in operation 1300), the controller 130 determines whether the domain and task belong to a local service (1700).

When the determined domain and task belong to the local service (Yes in operation 1700), the controller 130 determines requests of other passengers located in a same zone as the passenger who inputs the request in the vehicle 200 (1800). As a result of determining the other passengers' requests in the same zone, when the request of the passenger is approvable (Yes in operation 1500), the controller 130 transmits a control signal for providing a local service corresponding to the request of the passenger to the vehicle 200 (1600).

When the determined domain and task do not belong to the local service (No in operation 1700), the controller 130 determines that the domain and task belongs to a personal service and transmits a control signal for providing a personal service to the corresponding passenger to the vehicle 200 (1600).

Figure 6:
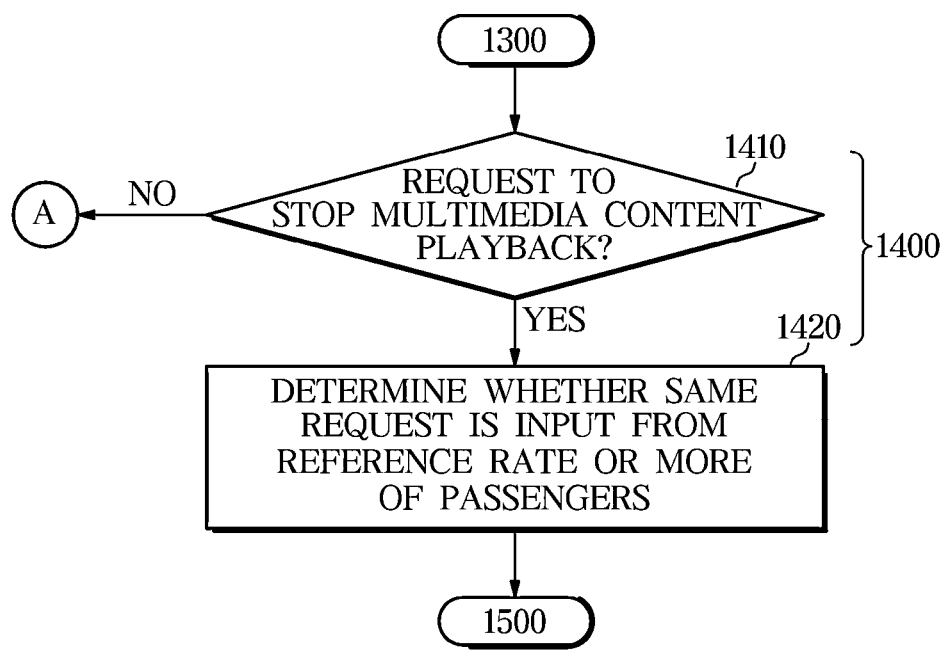
FIGS. 6 and 7 are flowcharts illustrating operations of determining other passengers' requests when a request belonging to a global service is input in a service management method for a vehicle according to an embodiment.
Figure 7:
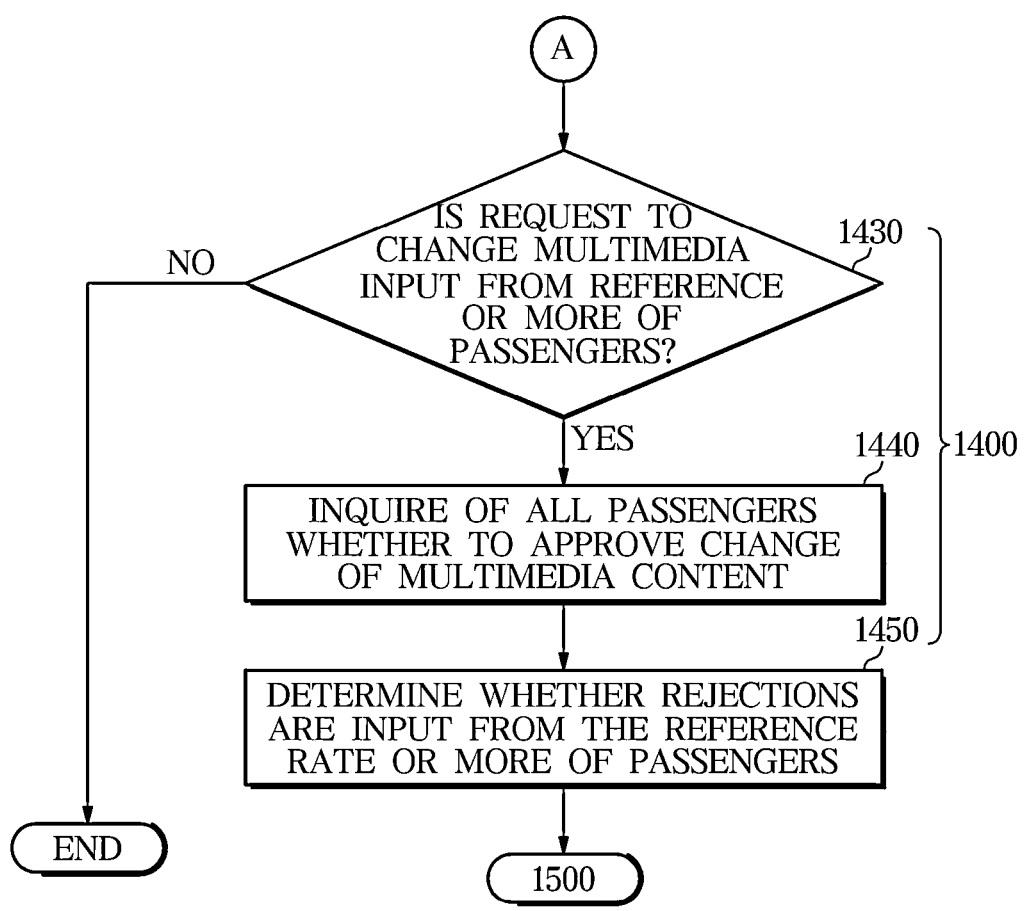

FIGS. 6 and 7 are flowcharts illustrating operations of determining other passengers' requests when a request belonging to a global service is input in a service management method for a vehicle according to an embodiment. FIGS. 8-11 are diagrams illustrating examples of a method of receiving approval for change of content from other passengers in a service management method for a vehicle according to an embodiment. In the example, the example where a passenger's request is to stop or change multimedia content playback is described.

Referring to FIG. 6, determining other passengers' requests (1400) may include determining whether a same request is input from a reference rate or more of passengers (1420), when the passenger's request is to stop the multimedia content playback (Yes in operation 1410).

In other words, while a radio, music, or video is playing through the speaker 210 or the display 220 of the vehicle 200, when it is determined that the reference rate or more of the passengers request to stop playing the radio, music, or video, the passenger's request may be approved (Yes in operation 1500).

However, the requests of the plurality of passengers may not be input at the same time. Accordingly, each time another passenger's request is input, requests of other passengers accumulated so far may be determined. For example, when a passenger's request to stop multimedia content playback is input, the passenger's request may be approved when a same request accounts for more than the reference rate of the requests of the other passengers accumulated until the corresponding request is input from before a predetermined time point.

As a specific example, when a passenger's request to stop multimedia content playback is input, the passenger's request may be approved (Yes in operation 1500) when the same requests, accumulated from one minute before the corresponding request is input to a present point in time, account for more than 50% of total passengers' requests. Also, a control signal for stopping the multimedia content playback may be transmitted to the vehicle (1600). Here, the reference rate of '50%' is only an example, a reference rate greater than or less than 50% is applicable. Alternatively, the reference rate may be changed by a driver or a system administrator.

As another example, other passengers' requests accumulated while a single piece of content is being played may be determined. When a request to stop multimedia content playback is input, the request may be approved (Yes in operation 1500), at a point in time when the corresponding request is input, and when the stop requests accumulated from a beginning of the multimedia content being played to a present point in time account for more than 50% of total passengers' requests. Also, a control signal for stopping the multimedia content playback may be transmitted to the vehicle (1600).

When the same request (stop request) is not input at or above the reference rate, the passenger's request is not approved (No in operation 1500). However, even though the passenger's request is not approved at the point in time, the passenger's request may be included in accumulation data and may be later used to determine whether the same request is input at or above the reference rate when another passenger inputs the same request.

When the passenger's request is not about stopping multimedia content playback (No in operation 1410), it is determined that the passenger's request is to change the multimedia content being played, and thus the method proceeds to operations of FIG. 7.

In this case, determining the other passengers' requests (1400) may include determining whether a request to change multimedia content is input from a reference rate or more of the passengers (1430), also includes when it is determined that the request to change multimedia content is input from the reference rate or more of the passengers (Yes in operation 1430), inquiring of all passengers whether to approve the change of multimedia content (1440), and also include determining whether rejections are input from the reference rate or more of the passengers (1450).

Determining whether the request to change multimedia content is input from the reference rate or more of the passengers (1430) may be based on requests accumulated for a predetermined period of time or accumulated while currently playing multimedia content is being played.

As a specific example, when a passenger's request to change multimedia content is input, it may be determined whether, at a point in time when the corresponding request is input, same requests accumulated from a beginning of the multimedia content being played to a present point in time account for more than 30% of total passengers' requests.

Alternatively, it may be determined whether the same requests, accumulated from one minute before the corresponding request is input to a present point in time, account for more than 30% of total passengers' requests. In this instance, it is assumed that the same multimedia content is being played one minute before the corresponding request is input.

The request to change multimedia content may be a request for change to specific content or simply a request, such as "play another song/another radio channel".

Here, the reference rate of '30%' or the 'one minute' is only an example, a reference rate or a period of time greater or less than the above is applicable. Alternatively, the reference rate and period of time may be changed by a driver or a system administrator.

When the request to change multimedia content is input from the reference rate or more of the passengers (Yes in operation 1430), whether to approve the change of the multimedia content may be inquired to all passengers (1440).

The controller 130 may generate an inquiry signal for inquiring whether to approve and transmit the generated inquiry signal to the vehicle 200 or the user terminal 300 through the communication module 140.

Figure 8:
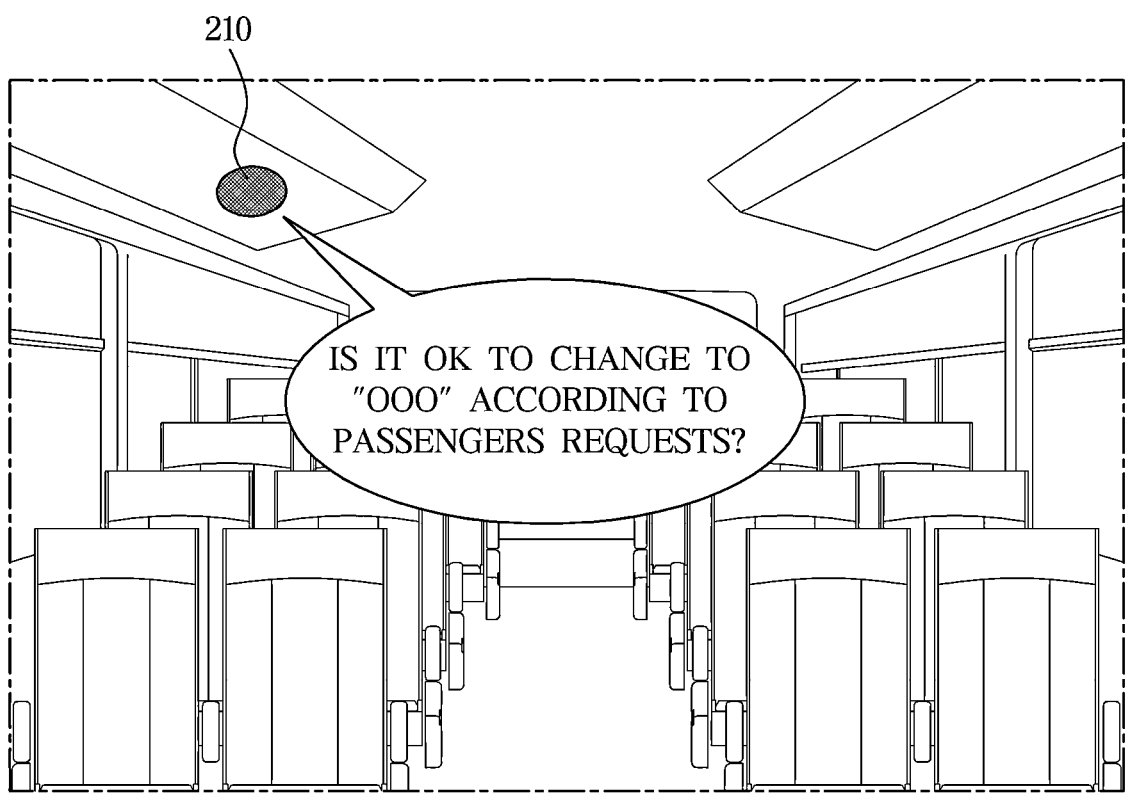
FIGS. 8-11 are diagrams illustrating examples of a method of receiving approval for change of content from other passengers in a service management method for a vehicle according to an embodiment.

The inquiry about whether to approve may be output visually or audibly. For example, as shown in FIG. 8, a speech, such as "is it ok to change the media to '000' according to the requests of passengers?", may be output through the speaker provided in the vehicle 200.

Figure 9:
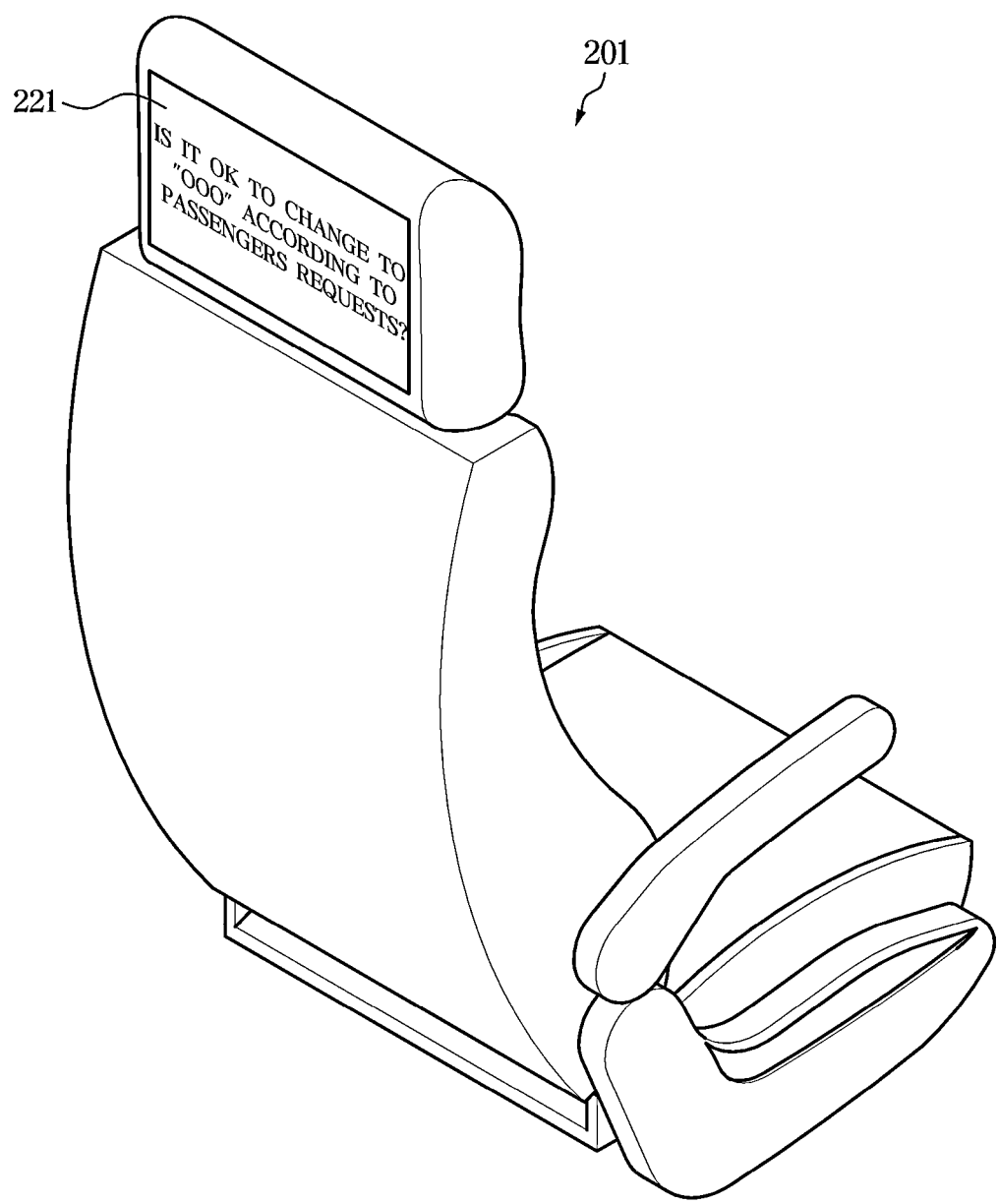

Alternatively, as shown in FIG. 9, when an individual display 221 is provided at each seat 201, a text, such as "is it ok to change the media to '000' according to the requests of passengers?", may be output on the individual display 221.

Figure 10:
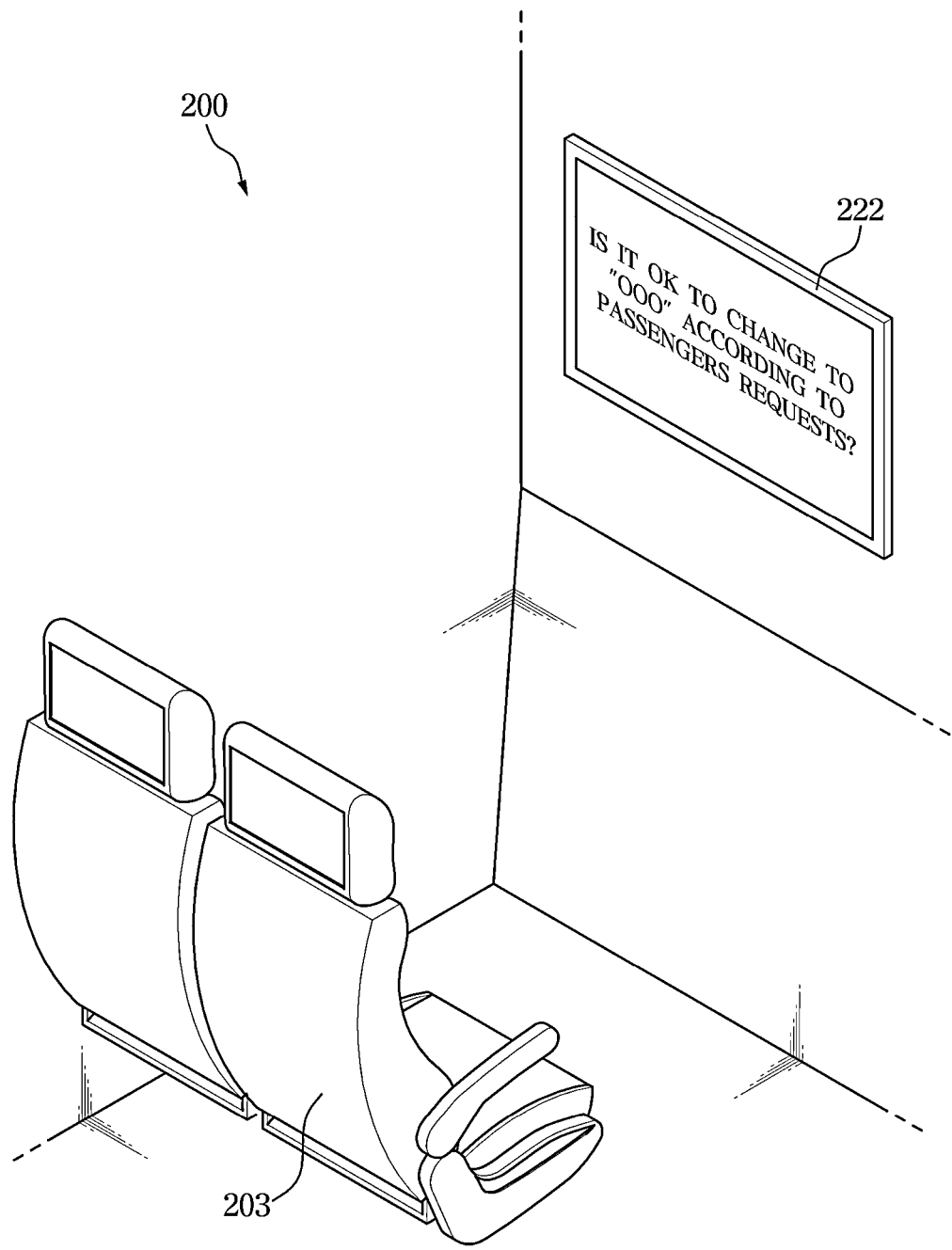

Alternatively, as shown in FIG. 10, when a shareable display 222 is provided in the vehicle 200, text such as "is it ok to change the media to '000' according to the requests of passengers?" may be output on the shareable display 222.

Figure 11:
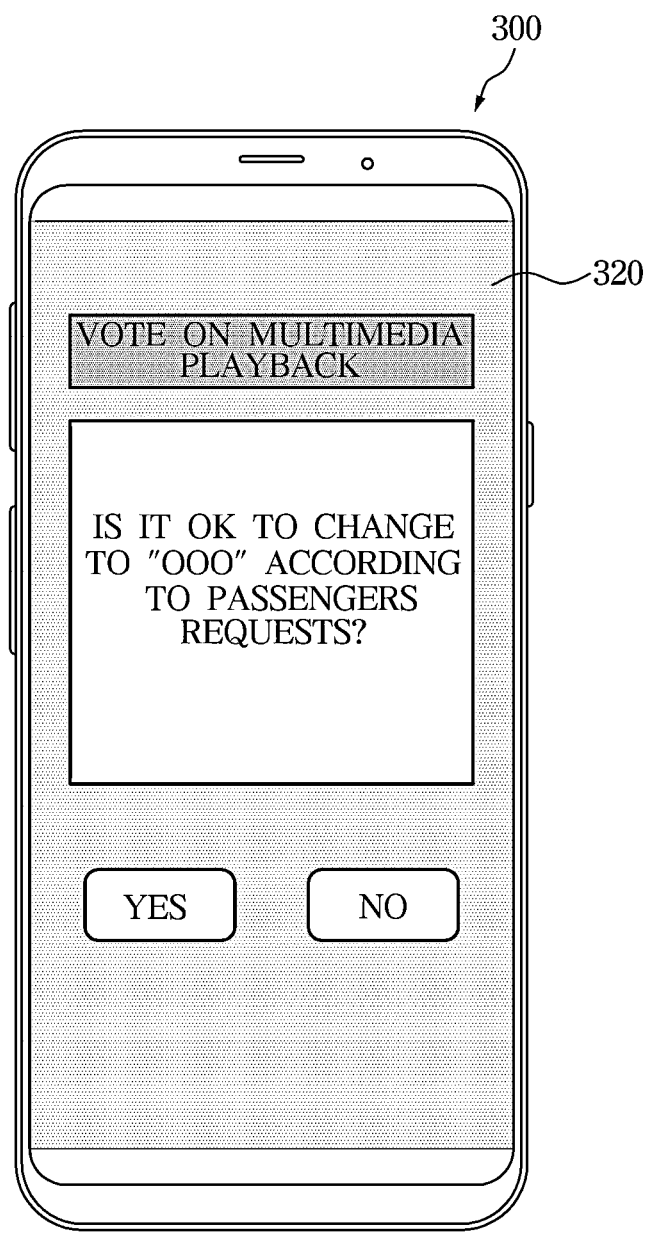

Alternatively, as shown in FIG. 11, when a dedicated application for connecting to the service management system 100 is installed in the user terminal 300 of the passenger, text such as "is it ok to change the media to '000' according to the requests of passengers?" may be output on a display 320 of the user terminal 300.

The above phrase of speech or text is only an example, and any phrase may be used as long as it may inquire about change of content.

Alternatively, the vehicle 200 may detect the user terminal 300 of a passenger and transmit a web page link for connecting to the service management system 100. In this case, when the passenger clicks the transmitted link, a screen for inquiring the change of content may be output.

Meanwhile, an above-described manner of inquiring whether to approve may be applied differently for each time period. For example, the inquiry may be audibly output through the speaker 210 during daytime and visually output through the display 220 at night.

A daytime period may be set from 7 am to 8 pm, and a night time period may be set from 8 pm to 7 am. However, the above time period is only an example, and the time period may be divided variously or be changed by a driver or system.

Alternatively, according to a determination of the driver or system, both a user interface provided in the vehicle 200 and the user terminal 300 may be used. In this case, however, only one of a vote input through the user interface 210 or 220 provided in the vehicle 200 or a vote input through the user terminal 300 may be reflected in a voting result to prevent double voting.

Meanwhile, content to be changed ("000" in the above example) may be determined based on a passenger's request or statistical data.

For example, the content to be changed may be determined based on a request input the most. Both a multimedia mode and content of two requests match, the two requests may be regarded as a same request. Here, the multimedia mode may include a music mode, radio mode, broadcast mode, podcast mode, YouTube mode, and the like, and the content may indicate an individual song, individual broadcast channel, individual podcast channel, individual YouTube channel, etc.

In this instance, content may also be determined as the content to be changed, only when the most input request is greater than or equal to a predetermined rate (e.g., 5% or more of the input change requests).

When input requests are all different, a multimedia mode requested the most may be selected, and content of the corresponding multimedia mode may be determined based on statistical data. For example, content played the most (content of the selected multimedia mode) in a corresponding time period in the vehicle 200 may be determined as the content to be changed.

Information about content played for each vehicle and for each time period may be stored in the memory of the vehicle 200 or the memory of the service management system 100. By using the statistical information, content may be selected in consideration of a use of each vehicle 200, passenger's taste, overall vibe of passengers, and the like.

For example, when the vehicle 200 is a bus running in a city according to a predetermine route, passengers during quitting time (e.g., between 5 pm and 7 pm) are likely to be on their way home from work and feel tired. Accordingly, such vibes or states of the passengers may be reflected in multimedia content mainly played in the vehicle 200 during the time period.

As another example, when the vehicle 200 is a tour bus heading to a specific tourist destination, excitement of passengers may be reflected in multimedia content mainly played in the vehicle 200 in a morning period (e.g., between 8 am and 10 am).

As in the above examples, when an approval of content change is inquired to all the passengers (1440), each of the passengers may input an answer to whether to approve. As an example, each passenger may input an answer of "yes" or "no" through an individual microphone 250 provided at or near each seat 201.

Alternatively, when the inquiry about approval is output on the display 221 provided in each seat 201 and when the display 221 is implemented with a touch screen, each of the passengers may input an answer of "yes" or "no" through the corresponding display 221.

Alternatively, when the inquiry about approval is output through the user terminal 300 of a passenger, as shown in FIG. 11, buttons for "yes (approval)" or "no (rejection)" may be displayed on the display 320 of the user terminal 300 together with text inquiring whether to approve.

When a passenger clicks the "yes" button, an approval signal may be transmitted to the service management system 100, and when the passenger clicks the "no" button, a rejection signal may be transmitted to the service management system 100.

In the service management method for a vehicle according to an embodiment, whether rejections are input from the reference rate or more of the passengers to determine whether to approve change of multimedia content (1450).

Passengers who do not answer the inquiry may exist. A change-oriented policy may be applied, i.e., when rejections are not input at or above the reference rate, the passengers who do not respond are considered to be in favor and the change of multimedia content is approved (Yes in operation 1500). For example, the change of multimedia content may be approved when more than 50% of rejections are not input.

Figure 13:
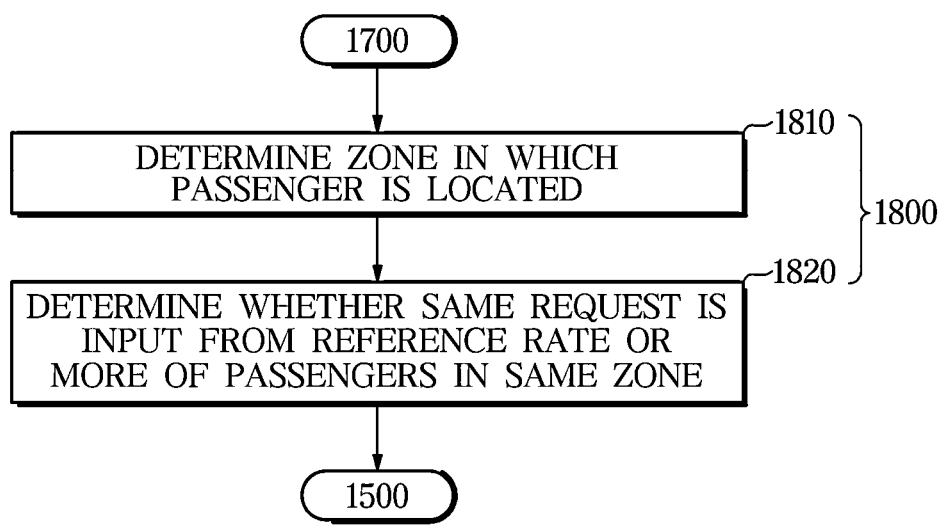
FIG. 13 is a flowchart illustrating an example when a passenger's request belongs to a local service in a service management method for a vehicle according to an embodiment.
Figure 14:
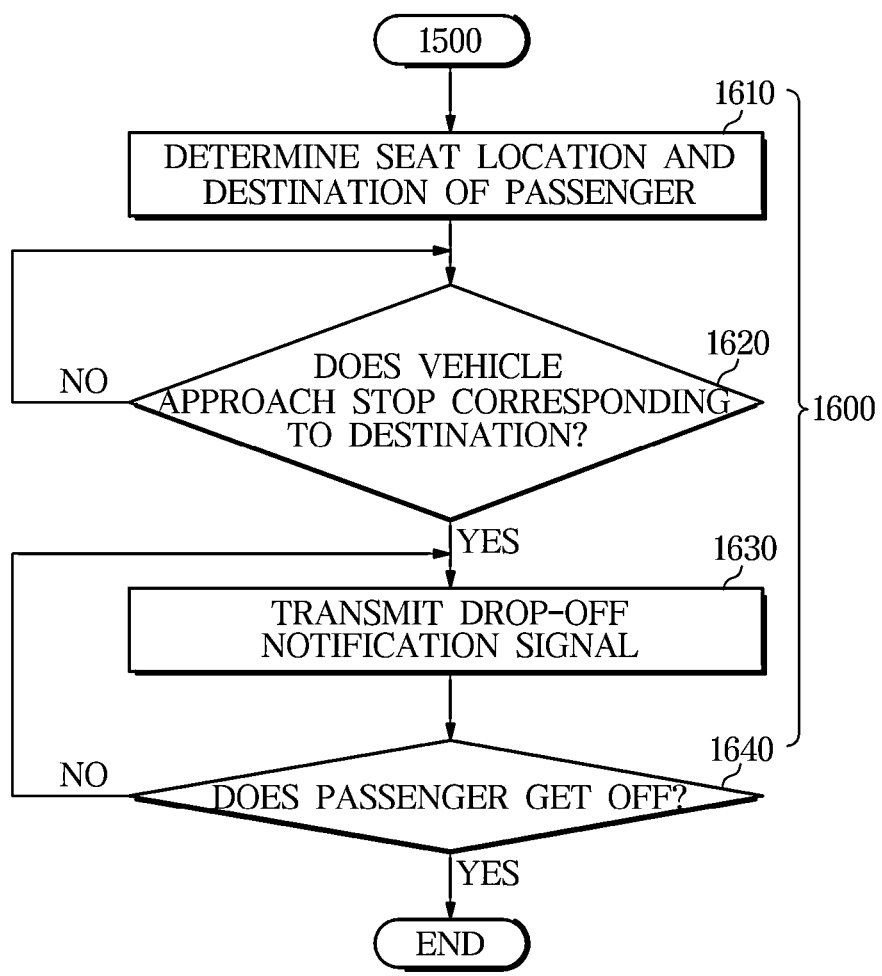
FIG. 14 is a flowchart illustrating an example when a passenger's request belongs to a personal service in a service management method for a vehicle according to an embodiment.

FIG. 13 is a flowchart illustrating an example when a passenger's request belongs to a local service in a service management method for a vehicle according to an embodiment. FIG. 14 is a flowchart illustrating an example when a passenger's request belongs to a personal service in a service management method for a vehicle according to an embodiment.

Referring again to FIG. 5, when the domain and the task corresponding to the passenger's request belongs to the local service (No in operation 1300, Yes in operation 1700), the controller 130 may determine requests of other passengers in the same zone (1800).

Referring to FIG. 13, to determine the other passengers' requests in the same zone (1800), a zone in which the passenger who inputs the request is located is determined (1810), and it may be determined whether a same request is input from a reference rate or more of passengers in the same zone (1820).

As described above, an air conditioning control may be an example of the local service. Here, the vehicle 200 may perform the air conditioning control independently for each zone, and a single zone consists of four seats 201 as shown in FIG. 4.

For example, when a request to increase a temperature is input from a passenger who is located in a zone 1 (Z1), and 50% or more of the passengers in the zone 1 input a same request, the passenger's request may be approved (Yes in operation 1500) and a control signal for increasing the temperature in the zone 1 may be transmitted to the vehicle 200.

When three passengers exist in the zone 1 and two of the three passengers input a request to increase a temperature, the request may be approved (Yes in operation 1500). By contrast, when three passengers exist in the zone 1 and one of the three passengers inputs a request to increase a temperature, the request may be rejected (No in operation 1500).

A criterion for determining a rate of passengers who input the same request may be requests input within a predetermined period of time based on a present point in time. In this instance, only requests, input in a state where a temperature of a corresponding zone is equal to or higher than a current temperature, or input in a state where a temperature of a corresponding zone is equal to or lower than the current temperature, may be counted as the same request.

For example, when a request to increase a temperature is input, it may be determined whether a same request is input based on requests input within five minutes from a present point in time. In this instance, only requests, input in a state where a temperature of a corresponding zone is equal to or higher than a current temperature, may be counted as the same request.

Meanwhile, when the passenger's input request belongs to neither the global service nor the local service (No in operation 1300, No in operation 1700), the request may belong to a personal service.

When the passenger's input request belongs to the personal service, a control signal for performing a task corresponding to the corresponding request may be transmitted without considering other passengers' requests (1600).

In the example, the requested personal service may be a drop-off notification service. Referring to FIG. 14, transmitting a control signal for providing the drop-off notification service (1600) may include determining a seat location and a destination of the passenger (1610) and when approaching a stop corresponding to the destination (Yes in operation 1620), transmitting a drop-off notification signal (1630).

When the passenger gets off after transmitting the drop-off notification signal (Yes in operation 1640), provision of the drop-off notification service may end, and when the passenger does not get off even after transmitting the drop-off notification signal (No in operation 1640), the drop-off notification signal may be transmitted again.

Like the other services described above, the request for drop-off notification service may be input through the microphone 250 provided around the seat 201. For example, a speech such as "drop me off at Gangnam station" may be input to the microphone 250.

The controller 130 may determine the destination of the passenger based on the input speech and determine the seat location of the passenger based on an identifier of the microphone 250 delivering the corresponding speech.

The controller 130 may monitor a location of the vehicle 200 and determine whether the vehicle 200 approaches a stop corresponding to the destination (1620).

When a name of a stop is included in the passenger's speech, i.e., the passenger's destination matches the name of the stop, the controller 130 may determine whether the vehicle 200 approaches the corresponding stop. When a name of a stop is not included in a passenger's speech, i.e., the passenger's destination does not match the name of the stop, the controller 130 may search for a stop closest to the destination.

When the vehicle 200 approaches the stop corresponding to the destination (Yes in operation 1620), the drop-off notification signal may be transmitted to the vehicle 200 and a drop-off notification message may be output through a display or speaker for driver among the display 220 or speaker 210 of the vehicle 200. Alternatively, when the vehicle 200 is in an autonomous driving mode, the controller 230 may automatically stop the vehicle 200.

Meanwhile, when the vehicle 200 approaches the stop corresponding to the destination, the drop-off notification message may be output through the individual display 221 of the passenger. Alternatively, the drop-off notification message may be output through the user terminal 300 of the passenger.

Whether the passenger has got off may be monitored based on at least one of an output of a seat sensor provided in each seat 201 or an image capturing an inside of the vehicle 200. For example, at least one camera for photographing the inside of the vehicle 200 may be mounted in the vehicle 200.

Alternatively, the controller 130 may automatically control opening and closing of a door of the vehicle 200. For example, when the vehicle 200 is stopped at the stop corresponding to the destination, the controller 130 may transmit a control signal to the vehicle 200 so that a door of the vehicle 200 is automatically open and the door may remain open until the passenger gets off.

A time of getting off the passenger may be determined based on an output of the seat senor and a distance from the corresponding seat and the door, and also based on an image captured by the camera.

Figure 12:
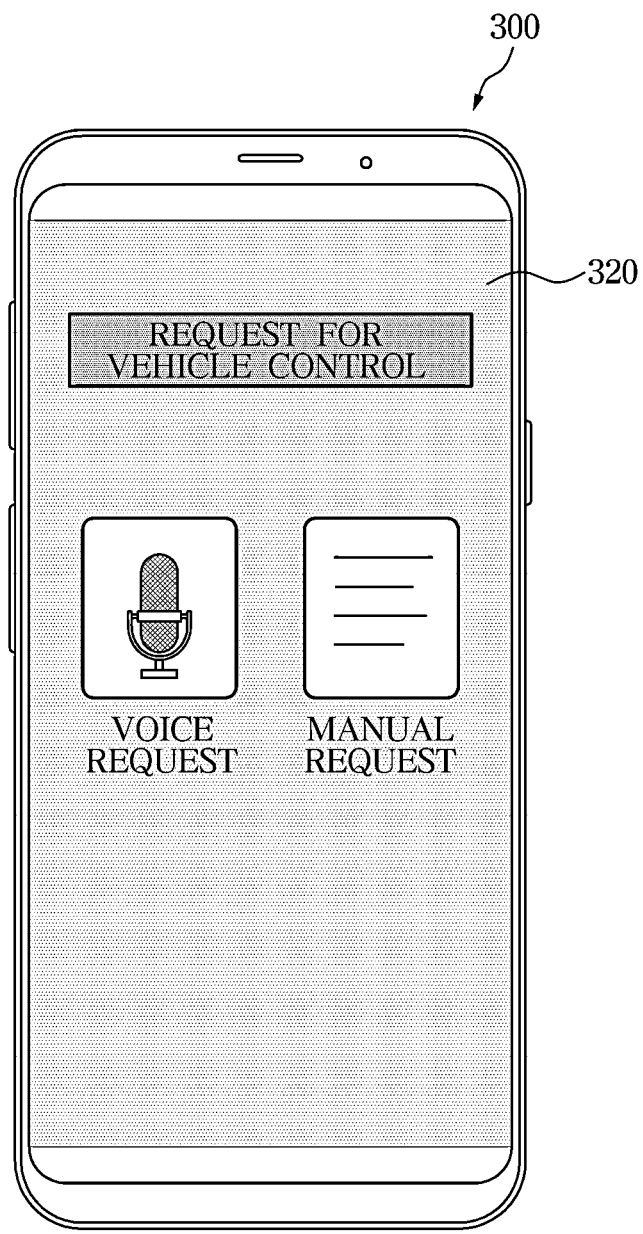
FIG. 12 is a diagram illustrating an example of a user terminal used as a user interface for performing a service management method for a vehicle according to an embodiment.

FIG. 12 is diagram illustrating an example of a user terminal used as a user interface for performing a service management method for a vehicle according to an embodiment.

In the above example, the example where the microphone 250 and the display 220 provided in the vehicle 200 are used as a user interface for receiving a passenger's request or confirming other passengers' requests has been described.

As another example, the user terminal 300 of a passenger may be used as a user interface. To this end, as described above, a dedicated application may be installed in the user terminal 300, and the vehicle 200 may transmit a web page link through a broadcasting message.

When a passenger agrees to an execution of a vehicle control function after running the dedicated application or connecting to the transmitted web page link, a screen shown in FIG. 12 may be displayed on the display 320. The passenger may select a voice request to input a request of the passenger by voice through a microphone of the user terminal 300 and select a manual request to manually input the request of the passenger through buttons displayed on the display 320.

The passenger's voice input through the microphone of the user terminal 300 may be transmitted to the service management system 100.

Also, as shown in FIG. 11 above, the passenger may participate in a vote related to change of in-vehicle service by using the user terminal 300.

When the passenger agrees to the execution of the vehicle control function after running the dedicated application or connecting to the transmitted web page link, the vehicle 200 may monitor whether the user terminal 300 is located in the vehicle 200, based on a received signal strength indicator (RSSI) measured based on an address of user terminal.

When the RSSI is lower than a reference value, the controller 230 of the vehicle 200 or the controller 130 of the service management system 100 may determine that a passenger got off the vehicle 200 and delete information about the passenger.

When the information about the passenger is deleted, although any request or command is input through the user terminal 300, the request or command may not be reflected in management of services provided to the vehicle 200.

FIG. 15 is a diagram illustrating an example of information provided to a driver through a display, in a vehicle according to an embodiment.

In the above example, the example where a service provided according to a passenger's request is automatically controlled has been described. In the service management system and the service management method according to an embodiment, a service control mode may be divided into a manual control mode and an automatic control mode. When the automatic control mode is set, a service may be automatically controlled by transmitting a control signal to the vehicle 200 according to the above-described example. When the manual control mode is set, a passenger's request may be transmitted to a driver.

The passenger's request may be transmitted as the passenger's voice is and may also be transmitted as a processing result (domain, task) of the natural language understanding module 120.

For example, as shown in FIG. 15, icons through which a passenger's request may be intuitively recognized may be displayed on the display 220 of the vehicle 200. One of the icons shown in FIG. 15 may be displayed according to a domain and a task corresponding to the passenger's request.

The display 220 on which the icons are displayed may be a head-up display (HUD) or an audio video navigation (AVN) display. Alternatively, the display 220 may be a display provided in a cluster.

Buttons (√, X) for selecting approval or rejection of request may be displayed together with the icons. A driver may determine what a currently input request is through the icons displayed on the display 220 and select an approval button or a rejection button considering a situation inside the vehicle 200.

When the approval button is selected, operations according to the above-described automatic control mode may be performed, and when the rejection button is selected, the passenger's request is ignored. However, when the passenger's request is ignored, a message notifying that the currently requested service may not be provided may be output through the speaker 210 or the display 220 of the vehicle 200, or through the user terminal 300.

Alternatively, the driver may directly perform control for providing the requested service. When an air conditioning-related request is input, the driver determines whether to approve the corresponding request and then may raise or lower a temperature of a corresponding zone. When a request to change multimedia content is input, the driver may directly change the multimedia content playback.

As is apparent from the above, according to the embodiments of the disclosure, the service management system for a vehicle and the service management method for a vehicle can receive a request from a passenger in a van by voice, determine whether to approve the request considering other passengers' opinions in the van, and then automatically perform relevant controls. Thus, the system and the method may fully reflect the passenger's request and provide a comfortable boarding environment even in the van carrying a large number of passengers.

Although embodiments have been described for illustrative purposes, those having ordinary skill in the art should appreciate that various modifications, additions, and substitutions are possible, without departing from the scope and spirit of the disclosure. Therefore, embodiments have not been described for limiting purposes.

What is claimed is:

1. A service management system for a vehicle that manages a service provided to the vehicle, the service management system comprising:
   a speech recognition module configured to convert a request of a passenger input by voice into a text;
   a natural language understanding module configured to determine a domain and a task corresponding to the request of the passenger based on the text; and
   a controller configured to:
      determine whether the request of the passenger belongs to a global service or a local service based on the determined domain and task,
      when the request of the passenger belongs to the global service, determine whether to approve the request of the passenger based on other passengers' requests in the vehicle, and when the request of the passenger belongs to the local service, determine whether to approve the request of the passenger based on requests of other passengers located in a same zone as the passenger in the vehicle.

2. The service management system of claim 1, wherein when the request of the passenger belongs to the global service, the controller is configured to determine whether a request identical to the request of the passenger is input from a reference rate or more of passengers of all passengers in the vehicle.

3. The service management system of claim 2, wherein when the request of the passenger belongs to the global service, the controller is configured to approve the request of the passenger, based on the request identical to the request of the passenger being input from the reference rate or more of the passengers.

4. The service management system of claim 2, wherein when the request of the passenger belongs to the global service, the controller is configured to:
generate an inquiry signal for inquiring of all the passengers in the vehicle whether to approve the request of the passenger based on the request identical to the request of the passenger being input from a first reference rate or more of passengers, and
approve the request of the passenger based on rejections not being input from a second reference rate or more of passengers of all the passengers.

5. The service management system of claim 1, wherein when the request of the passenger belongs to the local service, the controller is configured to approve the request of the passenger based on a request identical to the request of the passenger being input from a reference rate or more of passengers of all passengers in the same zone as the passenger.

6. The service management system of claim 1, wherein the controller is configured to:
determine whether the request of the passenger belongs to a personal service, and
when the request of the passenger belongs to the personal service, determine a location of a seat of the passenger and generate a control signal for providing a service corresponding to the request based on the location of the seat of the passenger.

7. The service management system of claim 4, further comprising:
a communication module configured to communicate with a user terminal of the passenger or the vehicle.

8. The service management system of claim 7, wherein the controller is configured to:
generate an audible inquiry signal for audibly inquiring of all the passengers in the vehicle whether to approve the request of the passenger, and
control the communication module to transmit the generated audible inquiry signal to the user terminal of the passenger or the vehicle.

9. The service management system of claim 7, wherein the controller is configured to:
generate a visual inquiry signal for visually inquiring of all the passengers in the vehicle whether to approve the request of the passenger, and
control the communication module to transmit the generated visual inquiry signal to the user terminal of the passenger or the vehicle.

10. The service management system of claim 7, wherein the controller is configured to control the communication module to transmit the inquiry signal to the user terminal of the passenger.

11. A service management method for a vehicle that manages a service provided to the vehicle, the service management method comprising:
converting a request of a passenger input by voice into a text;
determining a domain and a task corresponding to the request of the passenger based on the text;
determining whether the request of the passenger belongs to a global service or a local service based on the determined domain and task;
when the request of the passenger belongs to the global service, determining whether to approve the request of the passenger based on other passengers' requests in the vehicle; and
when the request of the passenger belongs to the local service, determining whether to approve the request of the passenger based on requests of other passengers located in a same zone as the passenger in the vehicle.

12. The service management method of claim 11, wherein when the request of the passenger belongs to the global service, determining whether to approve the request of the passenger comprises determining whether a request identical to the request of the passenger is input from a reference rate or more of passengers of all passengers in the vehicle.

13. The service management method of claim 12, wherein when the request of the passenger belongs to the global service, determining whether to approve the request of the passenger comprises approving the request of the passenger based on the request identical to the request of the passenger being input from the reference rate or more of the passengers.

14. The service management method of claim 12, wherein when the request of the passenger belongs to the global service, determining whether to approve the request of the passenger comprises:
generating an inquiry signal for inquiring of all the passengers in the vehicle whether to approve the request of the passenger based on the request identical to the request of the passenger being input from a first reference rate or more of passengers, and
approving the request of the passenger based on rejections not being input from a second reference rate or more of passengers of all the passengers.

15. The service management method of claim 11, wherein when the request of the passenger belongs to the local service, determining whether to approve the request of the passenger comprises approving the request of the passenger based on a request identical to the request of the passenger being input from a reference rate or more of passengers of all passengers in the same zone as the passenger.

16. The service management method of claim 11, further comprising:
determining whether the request of the passenger belongs to a personal service;
when the request of the passenger belongs to the personal service, determining a location of a seat of the passenger; and
generating a control signal for providing a service corresponding to the request based on the location of the seat of the passenger.

17. The service management method of claim 11, wherein determining whether to approve the request of the passenger comprises:

generating an audible inquiry signal for audibly inquiring of all passengers in the vehicle whether to approve the request of the passenger, and transmitting the generated audible inquiry signal to a user terminal of the passenger or the vehicle.

18. The service management method of claim 11, wherein determining whether to approve the request of the passenger comprises:

generating a visual inquiry signal for visually inquiring of all passengers in the vehicle whether to approve the request of the passenger, and transmitting the generated visual inquiry signal to a user terminal of the passenger or the vehicle.

19. The service management method of claim 11, further comprising:

transmitting, to the vehicle, information about the domain and the task corresponding to the request of the passenger.

20. The service management method of claim 11, wherein determining whether to approve the request of the passenger comprises:

generating an audible inquiry signal for audibly inquiring of all passengers in the vehicle whether to approve the request of the passenger during daytime, and generating a visual inquiry signal for visually inquiring of all the passengers in the vehicle whether to approve the request of the passenger at night.

* * * * *